US010402056B2

United States Patent
Ma et al.

(10) Patent No.: US 10,402,056 B2
(45) Date of Patent: Sep. 3, 2019

(54) SELECTING AND MANAGING DEVICES TO USE FOR VIDEO CONFERENCING

(71) Applicant: Blue Jeans Network, Inc., Mountain View, CA (US)

(72) Inventors: Luke Ma, San Jose, CA (US); Nithin Prakash, Sunnyvale, CA (US); Jihan Chao, Santa Clara, CA (US); Shan Shen, Sunnyvale, CA (US); David Skuratowicz, Felton, CA (US)

(73) Assignee: Blue Jeans Network, Inc., Mountain View, CA (US)

( * ) Notice: Subject to any disclaimer, the term of this patent is extended or adjusted under 35 U.S.C. 154(b) by 0 days.

(21) Appl. No.: 16/017,599

(22) Filed: Jun. 25, 2018

(65) Prior Publication Data

US 2019/0004671 A1    Jan. 3, 2019

Related U.S. Application Data

(60) Provisional application No. 62/526,269, filed on Jun. 28, 2017.

(51) Int. Cl.
*H04N 7/14* (2006.01)
*G06F 3/0482* (2013.01)
*H04N 7/15* (2006.01)

(52) U.S. Cl.
CPC ........... *G06F 3/0482* (2013.01); *H04N 7/147* (2013.01); *H04N 7/15* (2013.01)

(58) Field of Classification Search
CPC ......... G06F 3/0482; H04N 7/147; H04N 7/15
See application file for complete search history.

(56) References Cited

U.S. PATENT DOCUMENTS

| 5,539,741 | A   | * | 7/1996  | Barraclough | H04L 12/1813 370/267 |
|-----------|-----|---|---------|-------------|----------------------|
| 8,581,957 | B2  | * | 11/2013 | Bengtsson   | H04N 7/147 348/14.08 |
| 2007/0112563 | A1 | * | 5/2007  | Krantz      | G10L 25/69 704/216   |
| 2010/0008650 | A1 |   | 1/2010  | Bull et al. |                      |
| 2011/0289410 | A1 | * | 11/2011 | Paczkowski  | G10L 21/06 715/716   |
| 2013/0106976 | A1 | * | 5/2013  | Chu         | H04L 65/1069 348/14.02 |

(Continued)

OTHER PUBLICATIONS

"How to use ManyCam with software & websites like Youtube, Skype, Tinychat, Chatroulette, Omegle, and more!", ManyCam. com (Aug. 22, 2014), retrieved Sep. 17, 2018 from the Internet: URL: https://web.archive.org/web/20140822205625/https://manycam. com/applications/?view=tinychat, 3 pages.

(Continued)

*Primary Examiner* — Stella L. Woo
(74) *Attorney, Agent, or Firm* — Ascenda Law Group, PC

(57) ABSTRACT

User interfaces are displayed for providing accessory selection options for video conferencing endpoint devices of a video conferencing endpoint. A determination of available input and output accessories for the endpoint is made and the options are presented simultaneously with one another via one or more of the user interfaces. Each respective accessory, along with informative metadata and performance indicators, is displayed for selection by a user for use with the endpoint.

12 Claims, 8 Drawing Sheets

(56) References Cited

U.S. PATENT DOCUMENTS

2016/0277708 A1* 9/2016 Rintel .................... H04N 7/142
2016/0323542 A1* 11/2016 Kim ................... H04N 21/4126

OTHER PUBLICATIONS

"How to use ManyCam with software & websites like Youtube, Skype, Tinychat, Chatroulette, Omegle, and more!", ManyCam.com (Jan. 28, 2015), retrieved Sep. 17, 2018 from the Internet: URL: https://web.archive.org/web/20150128013104/https://manycam.com/applications/?view=webex, 3 pages.

Aarons, "Switching From Laptop Webcam to External Webcam", Chron.com (Mar. 8, 2016), retrieved Sep. 17, 2018 from the Internet: URL: https://web.archive.org/web/20160308223535/https://smallbusiness.chron.com/switching-laptop-webcam-external-webcam-72980.html, 2 pages.

International Search Report and Written Opinion dated Sep. 25, 2018, from the ISA/European Patent Office, for International Patent Application No. PCT/US2018/039332 (filed Jun. 25, 2018), 16 pages.

* cited by examiner

SELECTING AND MANAGING DEVICES TO USE FOR VIDEO CONFERENCING

RELATED APPLICATIONS

This application claims the priority benefit of U.S. Provisional Patent Application No. 62/526,269, filed on Jun. 28, 2017, the disclosure of which is incorporated herein by reference in its entirety.

FIELD OF THE INVENTION

The present invention is directed to providing a video conference system with simultaneous presentation of endpoint device accessory options.

BACKGROUND

Conventional approaches to presenting endpoint device selection options for a video conference system typically set a default option, with a mechanism potentially available to select alternate installed endpoint device accessories (e.g., microphones, speaker systems, etc.). However, it becomes increasingly difficult to determine which accessory, if any, is an ideal choice for a particular circumstance or if there happens to be a problem or reduced performance of a selected accessory. When this situation occurs in a dedicated conference room setting, for example, a user is likely not aware of what accessories are available, or if any accessory selection is more desirable or appropriate for that particular conference room, leading to a diminished video conference experience.

SUMMARY

In light of the foregoing, the present inventors have recognized that a system configured to simultaneously display available endpoint device accessory options (e.g., available I/O accessories) for a video conference, with optional additional metadata regarding each accessory will improve a user's video conference experience. As such, methods and systems for selecting and managing accessories for use with video conference systems are provided.

Embodiments are described for selecting and managing endpoint device accessories for video conferencing. A user interface provides accessory selection options for video conferencing endpoint devices. A determination of available input and output accessories for the endpoint is made and the options are presented simultaneously with one another via the user interface. Each respective accessory, along with informative metadata and current function or performance indicators is displayed for selection by a user for use with the endpoint.

DETAILED DESCRIPTION

Embodiments of apparatuses, computer systems, computer readable mediums, and methods for selecting and managing device accessories to use for a video conference system are described. In certain embodiments, an "accessory" is a device providing audio or video input to or output from a video conference endpoint computing device. In certain embodiments, an accessory may be used to provide additional types of input/output data.

An example of a video conferencing system in which the present invention finds application is described in more detail below, with reference to FIGS. 1 and 2. As illustrated, such a video conferencing system may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones (mobile or otherwise), audio and dedicated video conferencing system devices, and/or any other device capable of sending and receiving data streams over a network. Participants may use proprietary or standards-based communication protocols with their endpoint devices, and the video conferencing system may enable a multi-party and/or point-to-point (e.g., between two endpoints) video conference session among the plurality of participant endpoints.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype™, etc.). For a non-limiting example, one such use of the video conferencing system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

Figure 1:
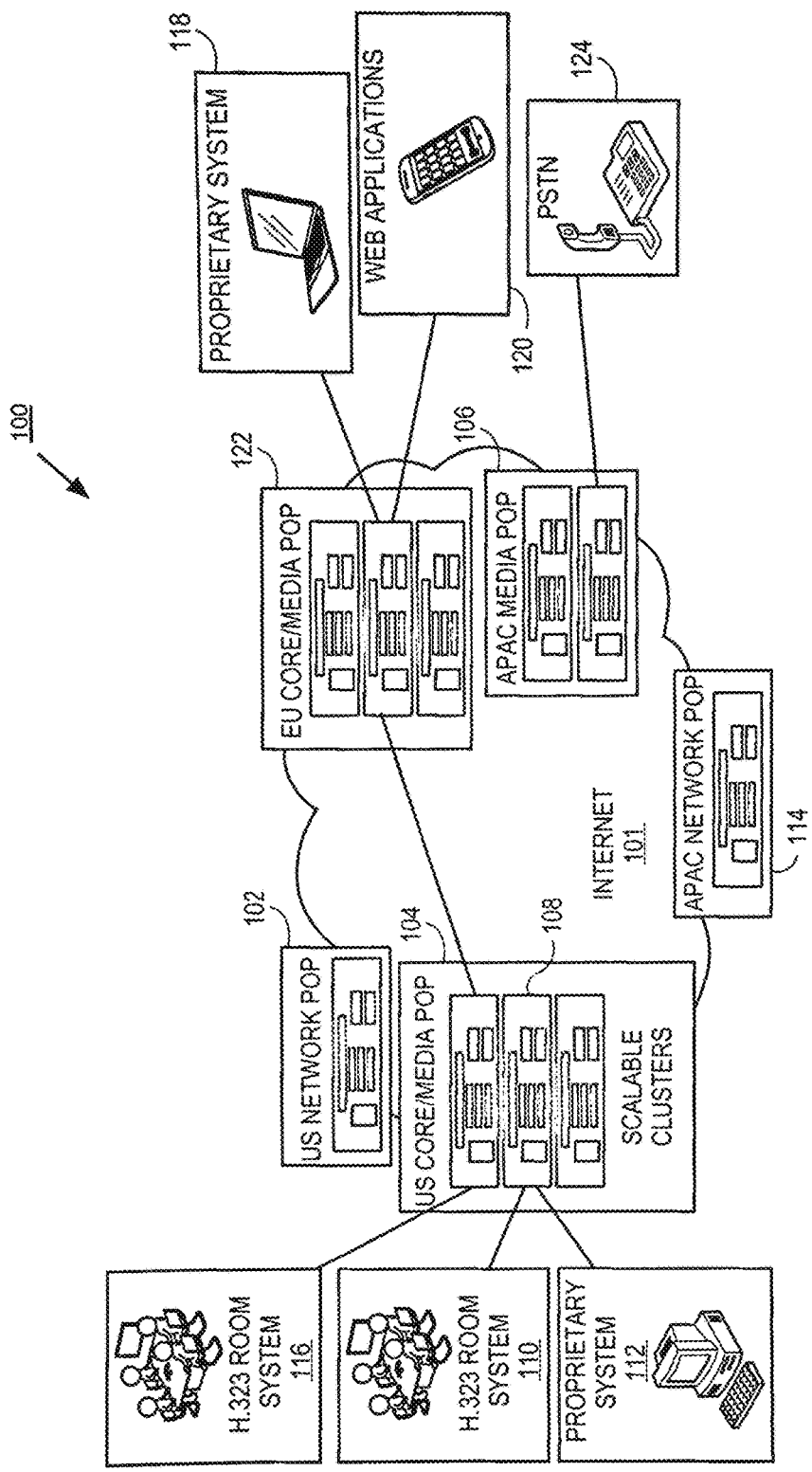
FIG. 1 depicts an exemplary system in accordance with some embodiments of the invention.

FIG. 1 depicts an exemplary videoconferencing system 100, in accordance with some embodiments of the invention. The videoconferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as a MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve the a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running Skype or Microsoft Lync™ (as shown with 112).

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. In some embodiments, each Core/Media POP may have the processing power (e.g., servers) to handle the load for that geographical region where the POP is located. In certain embodiments, endpoints connecting to the video conference system may be preferentially directed to the closest Core Media POP (e.g., the "connector" at a POP, described in more detail with FIG. 2) that can handle the processing for the conference so as to allow them to minimize their latency.

In some embodiments, the video conferencing system 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
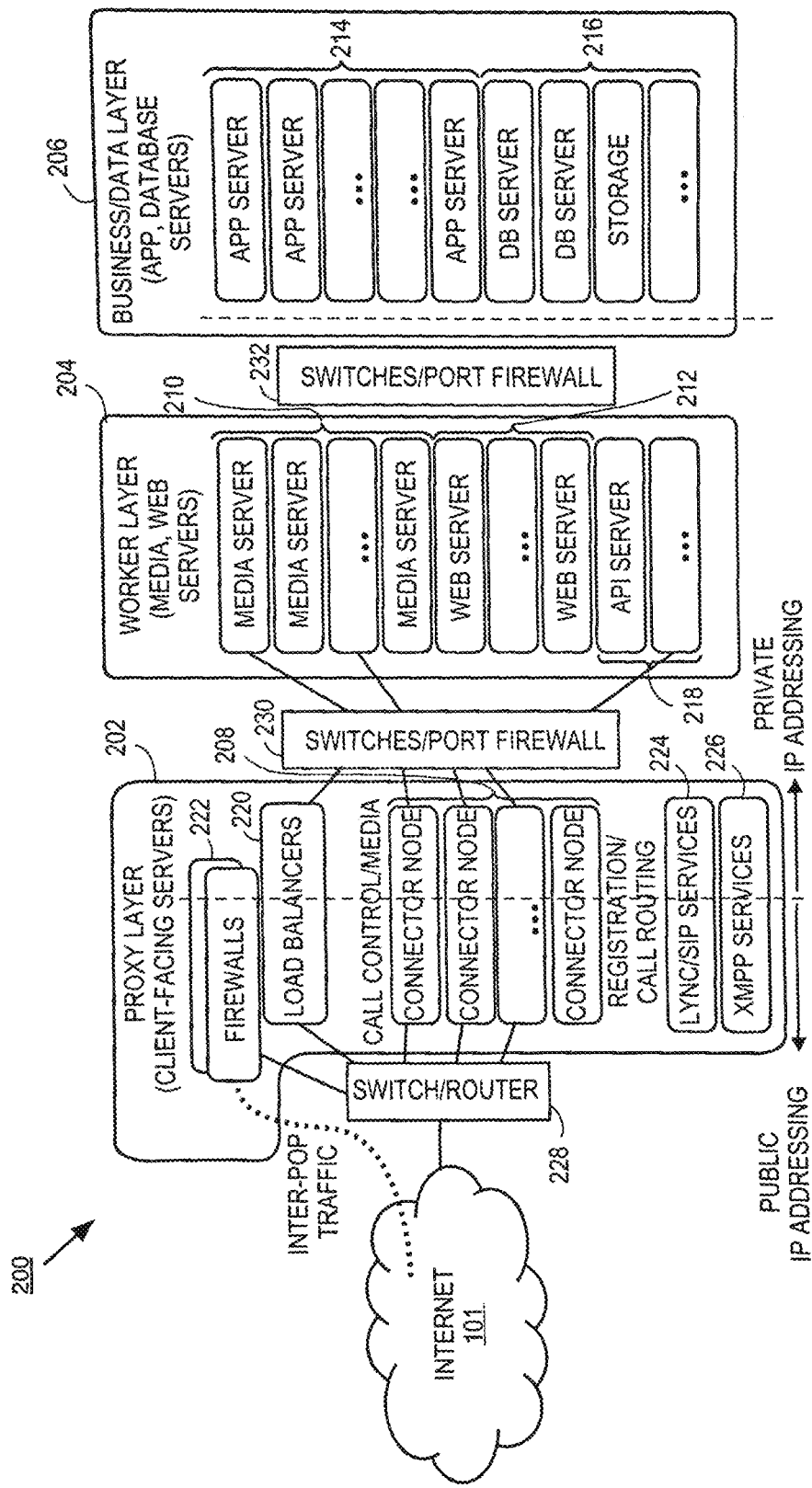
FIG. 2 depicts an exemplary system in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces.

Figure 3:
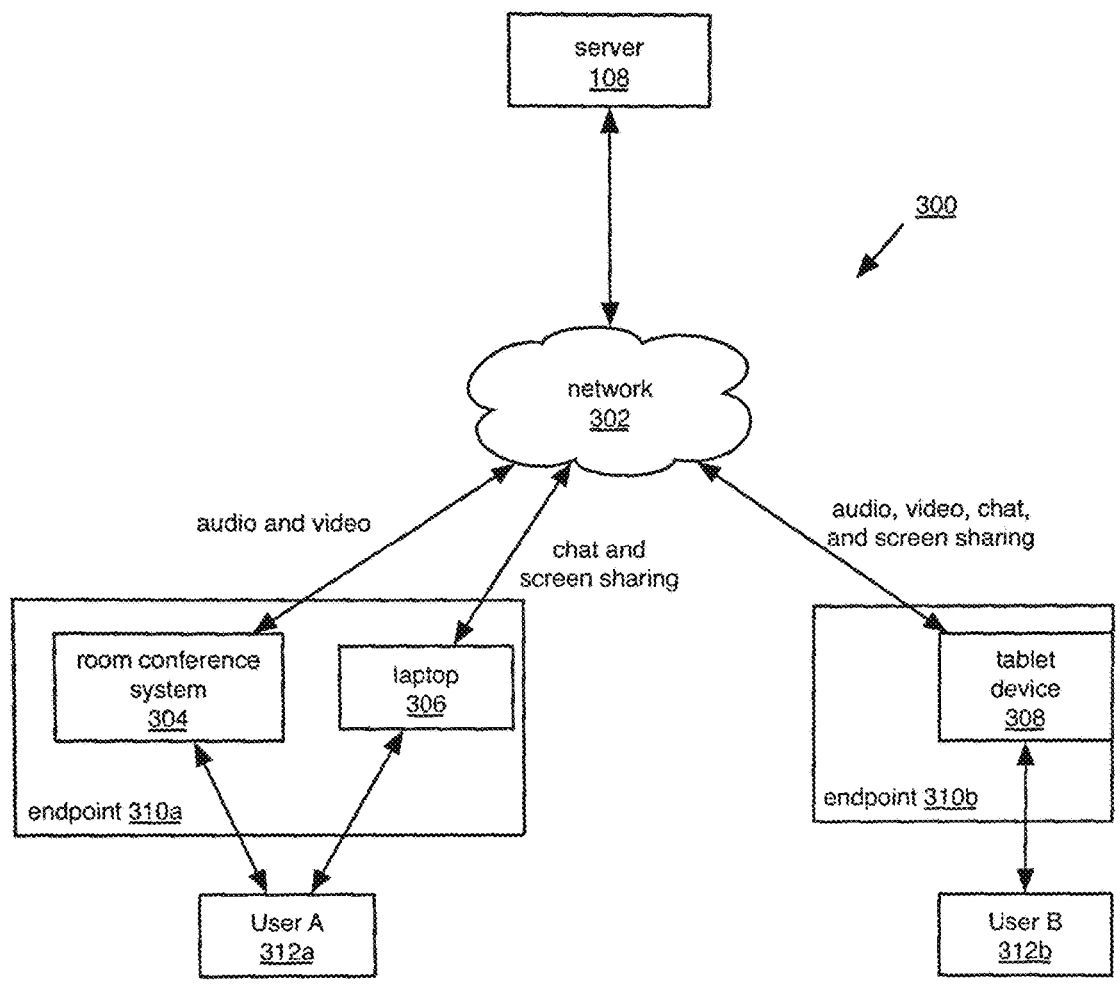
FIG. 3 depicts an exemplary system in accordance with some embodiments of the invention.

FIG. 3 shows exemplary components of a video conferencing system 300, in which multiple devices may form a single video conference endpoint, each device with its own set of capabilities and accessories. A user can join a video conference call with (i) a room conference system that can be used for audio and video, (ii) a tablet device or laptop that can be used for screen sharing, and (iii) a smart phone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat). As explained further below, each endpoint may include multiple accessories via which audio and/or video data may be presented and/or captured. For example, an endpoint may be configured with multiple different microphones that can be used to capture a user's voice as s/he speaks. Similarly, the endpoint may have multiple different speaker systems though which audio data may be played. And, the endpoint may have multiple different cameras which can be used to capture video data for sharing as part of the video conference.

Server 108 may support a set of capabilities, such as audio, video, chat, screen sharing and the like, for each user. A user can join a video conference with a first device that is capable of supporting audio/video and a second device that is better suited for content sharing and chat. Server 108 may associate a first user with both the first and second devices, and consequently can determine the communication modes (i.e., audio, video, content sharing and chat) that are associated with the first user. Network 302 may be a WAN, the internet, a telecommunications network, a LAN, or the like.

In certain embodiments, the user may identify himself/ herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition and/or alternatively, pairing may be heuristically determined by the server. For instance, server 108 may detect similar audio signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
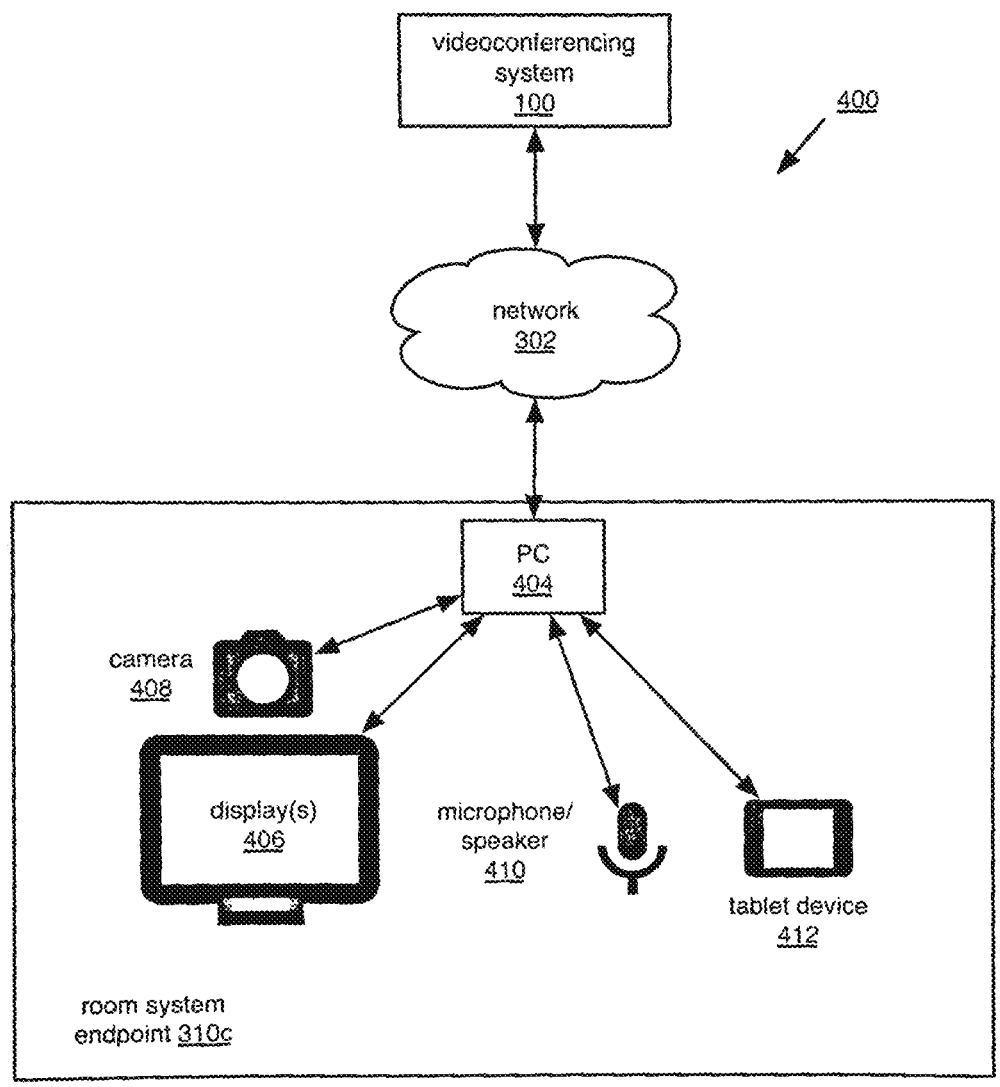
FIG. 4 shows components of a room system endpoint for a videoconferencing system in accordance with some embodiments of the present invention.

FIG. 4 shows the components of an exemplary room system endpoint 310c in a videoconferencing system 400. Room system endpoint 310c may comprise a personal computer 404, which may include integrated microphones and speakers (not shown), one or more displays 406, some of which may include an integrated camera (not shown), a camera 408, which may be configured for capturing moving and still images, a microphone and speaker system 410, and a tablet device 412. Personal computer 404 may act as a hub for some or all of the components of the room system endpoint 310c, and may be, for example, a small form-factor computer such as a Mac Mini or an Intel NUC (Next Unit of Computing) computer. Displays 406 may be a television, a monitor, or a projector and projector screen or white board. The microphone and speaker may be contained in a single device or multiple devices; as noted above, in certain embodiments the room system 310c may include multiple microphones and speakers and multiple cameras. Tablet device 412 (alternatively, another mobile device such as a smartphone) may provide a user interface for controlling the video conferencing experience at endpoint 310c.

Figure 5:
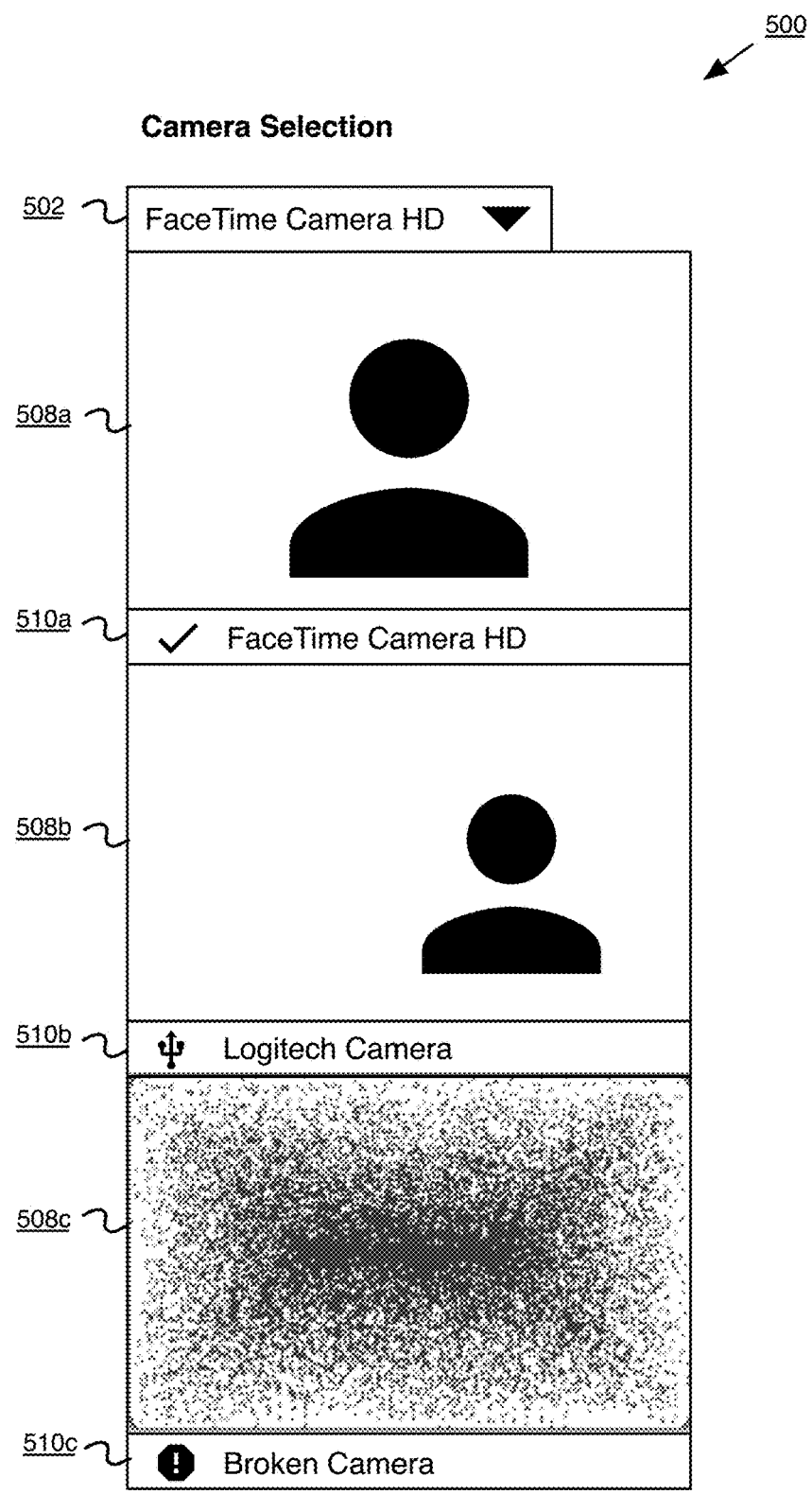
FIG. 5 shows an example of a graphical user interface portion with multiple camera options for a room system endpoint of a videoconferencing system in accordance with some embodiments of the present invention.

FIG. 5 shows one example of a graphical user interface portion 500 configured in accordance with an embodiment of the present invention. While previous user interfaces for video conferencing systems provided options for users to select from among multiple endpoint accessories (e.g., cameras, microphones, speakers, etc.), they did so by allowing serial selection (e.g., from dropdown menus or lists). Such a selection system provided no ability for a user to compare the video conferencing system experience afforded by each of the available selections without first selecting the accessory of interest. Further, the various accessories were often identified with ambiguous or system-derived names (e.g., "built-in camera," "display audio," etc.) that afforded a user little or no information. This often led to confusion over which accessory was actually being indicated, especially if the user was unfamiliar with the endpoint system being used.

The present invention alleviates these difficulties by presenting the user with all available accessory options, helpful metadata concerning the various accessory options (where available), and the ability to compare the video conferencing experience associated with each accessory option simultaneously, in order to better inform the user's selection of a given set of accessories. For example, in FIG. 5, camera selection options for a video conferencing session are being presented to the user. In this example, three cameras 408 are associated with room system endpoint 310c and have been discovered by client software running on the endpoint system. Feeds from each of the three cameras are presented to the user simultaneously via the present user interface. The feeds depict the views that will be provided by the endpoint system during operation of videoconferencing system 400.

In an exemplary embodiment, during startup of a video conference, simultaneous presentation of feeds (e.g. views 508a, 508b, and 508c) from all available cameras are shown to a user, such that the feeds provide a dynamically updated indication of the current functionality of respective camera. The current function indicator is dynamically displayed because as the media (e.g. the video) captured by the accessory changes, the current function indicator is updated to represent the real-time content of the media. The user can then select a preferred camera for use with room system endpoint 310c based on the view that is provided and the user's needs during the video conference. For example, if the user is going to be speaking, but not presenting other materials, view 508a from the FaceTime camera may be preferred as it presents the user in full frame. Alternatively, if the user is going to be speaking but also making reference to materials located elsewhere in the room, view 508b from the external Logitech Camera may be preferred as it provides a wider room view. Selection may be made by performing a mouse action that designates the user's choice (e.g., by selecting the desired view 508 from a camera selection drop down menu 502). Upon selection of the desired view 508 via a control element such as camera selection drop down menu 502, in certain embodiments the camera 408 associated with the selected view will immediately be used as the camera associated with endpoint 310c (e.g., when a video conference session is in progress). In certain embodiments, such as when the video conference session has not yet been initiated, a corresponding selected camera setting will be recorded for use when the session begins.

For example, in this illustration camera view 508a is labeled as FaceTime Camera HD and provides the display of a single user, centered in the frame. It is also the currently selected camera view, as indicated by the check mark next to the view label 510*a*. View 508*b* is labeled Logitech Camera, which shows a display of a single user positioned to the right side of the screen, and may be a more appropriate selection if another person joins the user at this room system endpoint 310*c*, and when and if that happens, this view can be selected using the present user interface. Finally, view 508*c* shows an unusable video output from a camera that is apparently broken and would not be used. Thus, the present user interface 500 allows the user to select the best camera view 508*a*-508*c* based on the desired user preferences and needs without having to manually select each available camera and compare the provided views in a serial fashion.

Figure 6A:
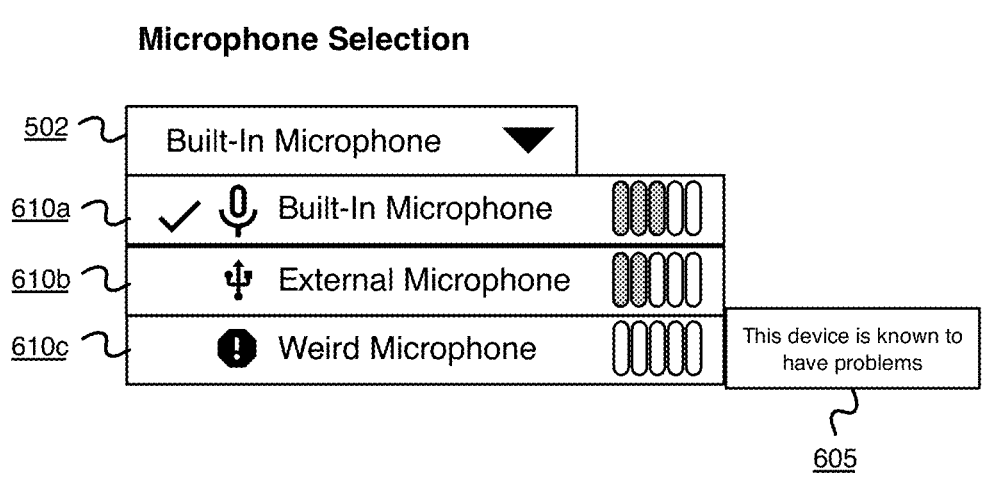
FIG. 6A shows an example of a graphical user interface portion for microphone selection for a room system endpoint of a videoconferencing system in accordance with some embodiments of the present invention.

FIG. 6A shows an example of a graphical user interface portion 600 for microphone selection in accordance with an embodiment of the present invention. Similar to the camera selection interface, simultaneous presentation of the available options for each accessory is provided. In some cases, the camera, speaker, and microphone selections may be presented in a common interface layout. In other instances, they may be presented separately, or in different groupings, some of which may be user-definable (e.g., through a preferences menu).

Indications of available microphones 410 which have been discovered by room system endpoint 310*c* are shown in a grouping, and dynamic bar graphs indicating their respective current audio capture volumes or sensitivities are presented simultaneously with one another (in microphone current function indicators 610*a*, 610*b*, and 610*c*), each showing an indication of the current function of their corresponding microphone. The bar graphs provide visual feedback indicating aspects of the current function of the microphones to assist a user in choosing a desired microphone 410. In this example, the bar graph associated with a first microphone, labeled "Built-In Microphone", shows a visual audio feedback of three out of five bars, and is the currently selected microphone (e.g., selected via a microphone selection drop down menu 502). The bar graph associated with microphone current function indicator 610*b*, labeled "External Microphone", shows two out of five bars, which could be due to its more distant location with respect to the current user who is speaking relative to the first microphone or the like. Further, the bar graph associated with microphone current function indicator 610*c*, labeled as "Weird Microphone", shows zero out of five bars, which can be indicative of a faulty microphone 410 or one that is perhaps incompatible with the video conferencing system. Metadata, displayed in the form of tool-tip 605, for the microphone associated with indicator 610*c* also is displayed to further indicate that this device has experienced problems in prior usage. This is a useful alert for the user, who now knows it is best not to use this accessory. Such metadata can be either determined and presented in response to user action (e.g., by hovering a cursor over an accessory label displayed in the user interface such as an indicator 610), or automatically determined by the client software running on room system endpoint 310*c* and displayed to the user during its operation. By presenting all of the available microphone options simultaneously with one another in this fashion, the user is relieved from having to make serial selections for evaluation purposes.

Figure 6B:
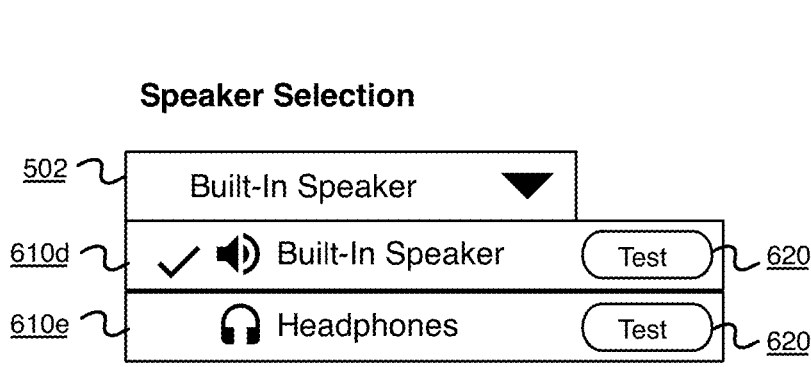
FIG. 6B shows an example of a graphical user interface portion for speaker selection for a room system endpoint of a videoconferencing system in accordance with some embodiments of the present invention.

Similarly, in FIG. 6B showing exemplary user interface portion 615, speaker selection is provided for. In this example, indicators 610*d* and 610*e* corresponding to two discovered speakers 410 are displayed, and the user is afforded means to compare the various speaker systems by activating respective test buttons 620. In response to activation of a control such as a selected test button, an audio tone, music clip, or similar audio output is played through the associated speaker 410, allowing the user to determine the best option of available speakers to use for room system endpoint 310*c*. By presenting all of the available speaker options simultaneously with one another in this fashion, the user is relieved from having to make serial selections for evaluation purposes.

Figure 6C:
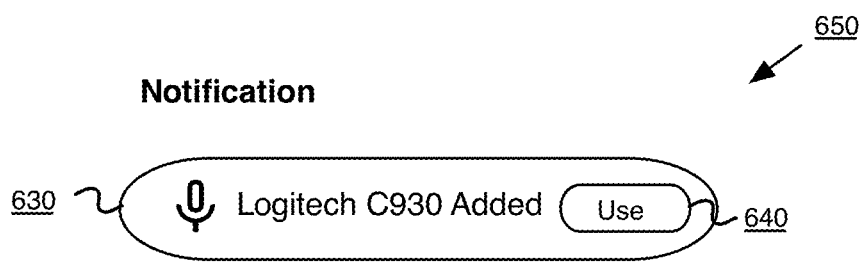
FIG. 6C shows an example of a notification bar of a graphical user interface for a room system endpoint of a videoconferencing system, which notification bar may be displayed during an active video conference in accordance with some embodiments of the present invention.

FIG. 6C shows another embodiment in user interface portion 650, in particular a notification bar 630, which may be displayed during an active video conference session upon detection of a new accessory. As an example, if during a video conference, a user plugs in a new microphone, client software running on room system endpoint 310*c* would detect the new accessory and display notification 630 to alert the user that it has been added. The user is also provided an option to select this accessory via a control (e.g., button 640) within the notification to provide for an immediate transfer of accessories in use while limiting the distraction to the video conference as well as elimination of navigating to a settings menu to use an added device. This selective notification would provide a user with only information about what has changed in the device setup, and would limit the scope of the user's interaction to only what has changed and which may require attention.

Figure 7:
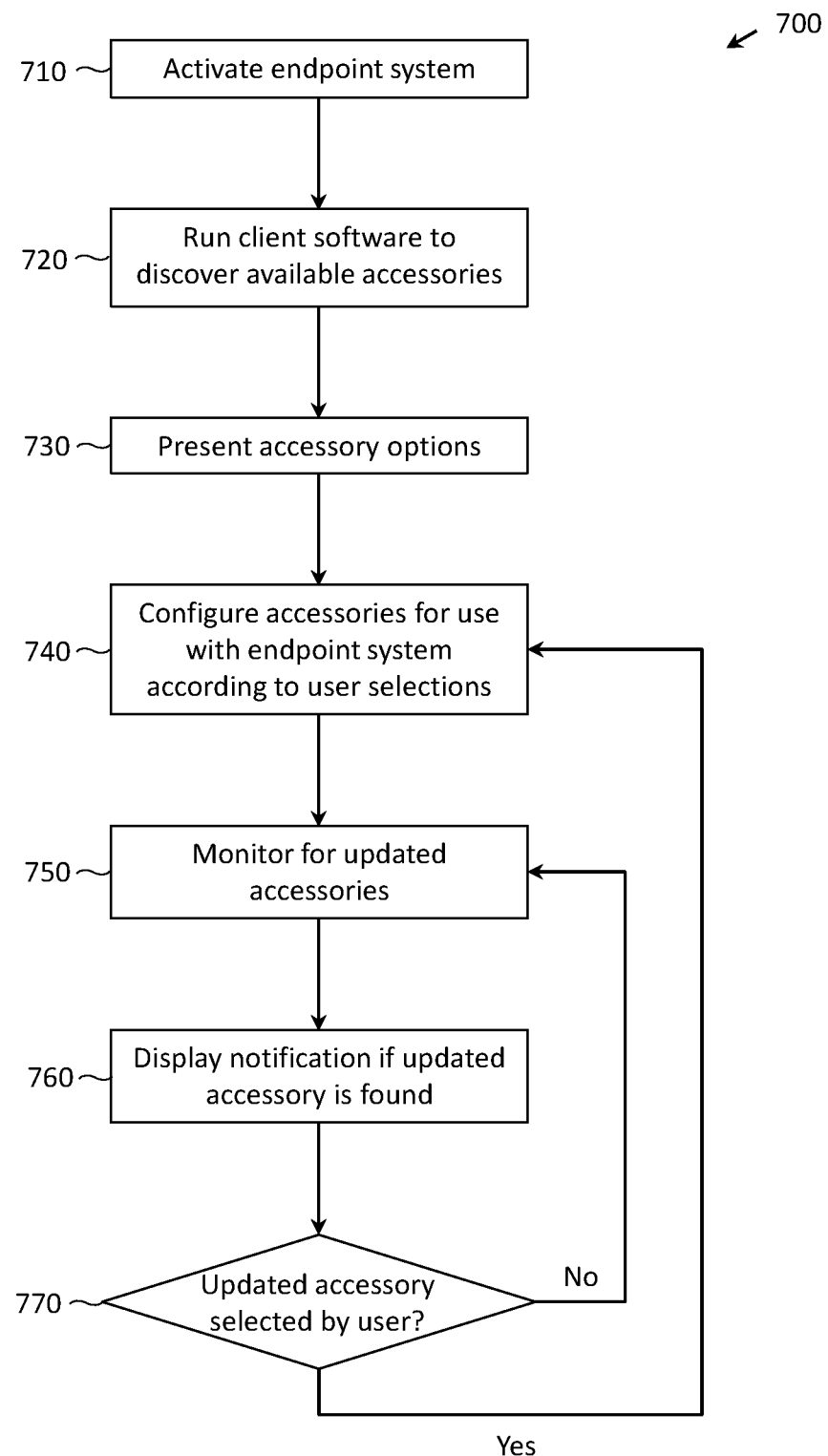
FIG. 7 depicts a flowchart of a method to select and manage accessories of a room system endpoint, in accordance with an embodiment of the invention.

As depicted in flowchart 700 of FIG. 7, when a user is ready to participate in a video conference, room system endpoint 310*c* is activated (step 710). In certain embodiments, endpoint 310*c* is not a room system—for example, the endpoint may be associated with only a computing device such as a laptop having built-in input devices and zero or more additional accessory devices. Once activated, client software is run to discover what accessories are available for use at the endpoint (step 720). In certain embodiments, the client device additionally obtains media streams generated by certain categories of the available accessories, such as cameras or microphones. Simultaneous presentation of available accessories are then presented to a user as described above (step 730). For example, the client user interface may display current function indicators that include a label for the accessory and a graphical indication describing the current media being captured by the accessory based on the media stream. In another example, the current function indicator may provide a control for playing a test media file or stream by the associated accessory. In another example, the client user interface may receive metadata concerning a prior video conference session regarding a particular accessory. This metadata may indicate that on one or more prior occasions, the accessory performed poorly (e.g., was incompatible with the endpoint, provided a low-quality input or output stream, or the accessory failed one or more times during a prior session). The user interface may provide a notification in connection with the current function indicator for the accessory to notify the user about the poor prior performance. The client user interface at the endpoint may further provide a selectable element, such as a drop-down menu, for choosing between the available accessories. Once selected, the accessories are configured for use with room endpoint system 310*c* according to the user's selections (step 740). During the use of room system endpoint 310*c*, the client software then continues to monitor for updated accessories, i.e. an additional camera, microphone or speaker which is added to room endpoint system 310*c* (step 750). If a new accessory is found, a notification as described above is presented to a user (step 760). If selected ("Yes" branch of step 770), the updated accessory is then configured for use according to the user selection (step 740), otherwise ("No" branch of step 770) the client software will continue to monitor for updated accessories (step 750).

Figure 8:
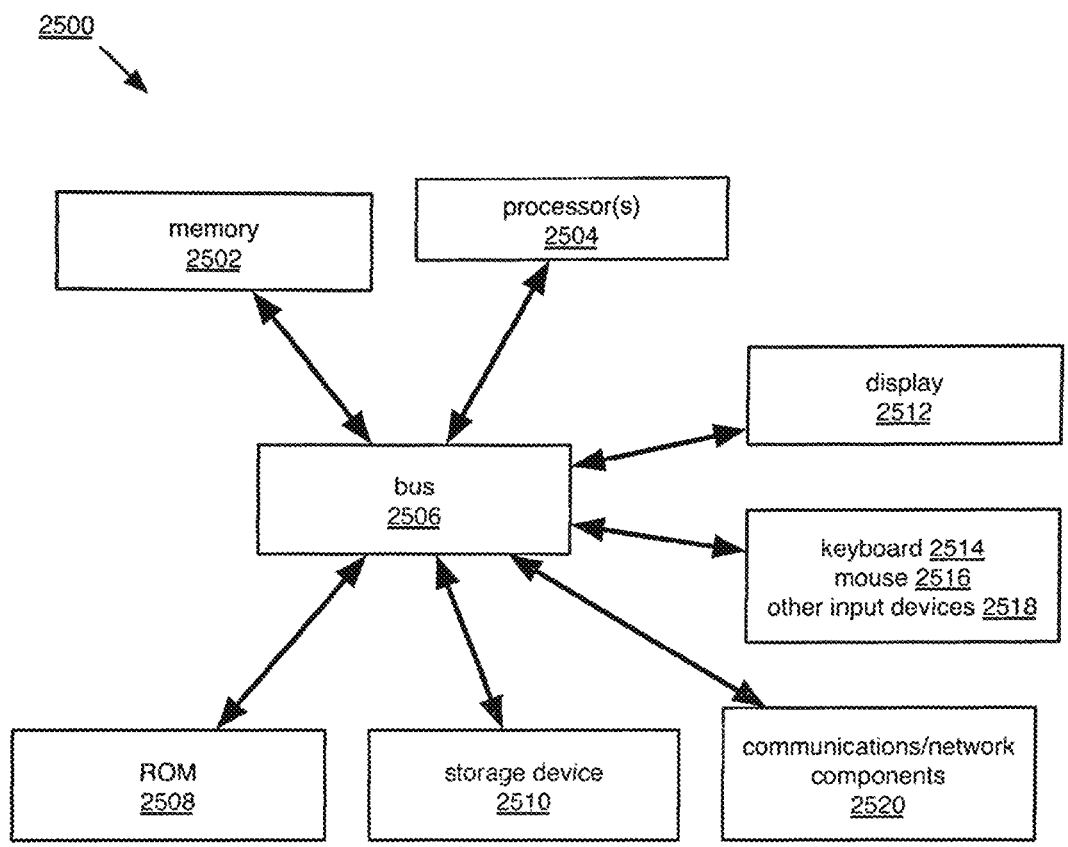
FIG. 8 depicts a block diagram showing an example of a computing system that is representative of any of the computer systems or electronic devices discussed herein.

FIG. 8 is a block diagram showing an exemplary computing system 2500 that is representative any of the computer systems or electronic devices discussed herein. Note that not all of the various computer systems have all of the features of system 2500. For example, systems may not include a display inasmuch as the display function may be provided by a client computer communicatively coupled to the computer system or a display function may be unnecessary.

System 2500 includes a bus 2506 or other communication mechanism for communicating information, and a processor 2504 coupled with the bus 2506 for processing information. Computer system 2500 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 2500 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 2500 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 2500 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed:

1. A method, comprising:
   at an endpoint of a video conference system, determining a plurality of accessories in an accessory category which are communicatively coupled to the endpoint and available for use during a video conference session;
   obtaining a respective media stream associated with each respective accessory of the plurality of accessories;
   dynamically and simultaneously displaying a plurality of current function indicators in a graphical user interface at the endpoint, each current function indicator corresponding to a respective accessory of the plurality of accessories, each current function indicator comprising an indication of a label for the respective accessory and a graphical indication describing current media being captured by the respective accessory based on the respective media stream;
   providing a first selectable element for choosing a first one of the accessories;
   receiving a selection of the first accessory via the first selectable element and associating the first accessory with the video conference session;
   receiving metadata concerning a prior video conference session regarding a second accessory of the plurality of accessories; and
   displaying a first notification based on the metadata in connection with the second accessory.

2. The method of claim 1, wherein the accessory category is cameras.

3. The method of claim 2, wherein the graphical indication describing the current media is a camera feed.

4. The method of claim 1, wherein the accessory category is microphones.

5. The method of claim 4, wherein the graphical indication describing the current media is a dynamic bar graph.

6. The method of claim 1, further comprising:
   during the video conference session, detecting, by the endpoint, a new accessory; and
   displaying a second notification regarding the new accessory, wherein the second notification comprises a second selectable element for associating the new accessory with the video conference session.

7. The method of claim 1, wherein the first notification indicates that the second accessory has performed poorly in the prior video conference session.

8. A method, comprising:
   at an endpoint of a video conference system, determining a plurality of accessories in an accessory category which are communicatively coupled to the endpoint and available for use during a video conference session;
   dynamically and simultaneously displaying a plurality of current function indicators in a graphical user interface at the endpoint, each current function indicator corresponding to a respective accessory of the plurality of accessories, each current function indicator comprising an indication of a label for the respective accessory and a test function control, wherein in response to a user's selection of the test function control, sample media is played via the respective accessory;

providing a first selectable element for choosing a first one of the accessories;

receiving a selection of the first accessory via the first selectable element and associating the first accessory with the video conference session;

receiving metadata concerning a prior video conference session regarding a second accessory of the plurality of accessories; and displaying a first notification based on the metadata in connection with the second accessory.

9. The method of claim 8, wherein the accessory category is speakers.

10. The method of claim 8, wherein the first selectable element is a drop-down menu.

11. The method of claim 8, further comprising:

during the video conference session, detecting, by the endpoint, a new accessory; and displaying a second notification regarding the new accessory, wherein the second notification comprises a second selectable element for associating the new accessory with the video conference session.

12. The method of claim 8, wherein the first notification indicates that the second accessory has performed poorly in the prior video conference session.

\* \* \* \* \*